United States Patent [19]
Drew et al.

[11] 3,753,336
[45] Aug. 21, 1973

[54] CENTRIFUGAL SEPARATION APPARATUS

[75] Inventors: John Drew; Robert Elliott Marks, both of Jacksonville, Fla.

[73] Assignee: Envirotech Corporation, Salt Lake City, Utah

[22] Filed: Apr. 6, 1972

[21] Appl. No.: 241,628

Related U.S. Application Data

[63] Continuation of Ser. No. 76,645, Sept. 29, 1970, abandoned, which is a continuation of Ser. No. 781,055, Dec. 4, 1968, abandoned.

[52] U.S. Cl................... 55/242, 55/459, 209/211, 210/512
[51] Int. Cl........................................... B01d 45/12
[58] Field of Search.................. 55/459, 242, 460, 55/391–399, 337; 209/211, 144; 210/512

[56] References Cited
UNITED STATES PATENTS

| | | | |
|---|---|---|---|
| 1,875,755 | 9/1932 | Noyes | 55/242 |
| 1,922,013 | 8/1933 | Brady | 55/460 |
| 2,106,589 | 1/1938 | Bigger et al. | 55/399 |
| 2,762,451 | 9/1956 | McNeil | 55/204 |
| 2,869,677 | 1/1959 | Yellott et al. | 55/459 |
| 3,349,548 | 10/1967 | Boyen | 55/459 |
| 3,499,270 | 3/1970 | Paugh | 55/459 |

FOREIGN PATENTS OR APPLICATIONS

| | | | |
|---|---|---|---|
| 365,778 | 1/1932 | Great Britain | 55/392 |
| 637,962 | 5/1950 | Great Britain | 209/211 |

Primary Examiner—Bernard Nozick
Attorney—Robert R. Finch

[57] ABSTRACT

This application discloses an apparatus for separating entrained liquids and solids from a gaseous stream containing entrained liquids and solids. The apparatus is described as a conical tubular envelope partitioned into a de-entrainment chamber and settling chamber by an apertured diaphragm or baffle plate. The gaseous stream tangentially enters the de-entrainment chamber wherein liquids and solids are centrifugally seapatated. The de-entrained liquids and solids pass through the apertured diaphragm into the settling chamber, while gaseous components leave through an outlet in the de-entrainment chamber.

The apparatus is particularly effective in removing entrained cooking liquids and woodpulp from the wet gaseous effluent of a woodpulp digester.

9 Claims, 6 Drawing Figures

3,753,336
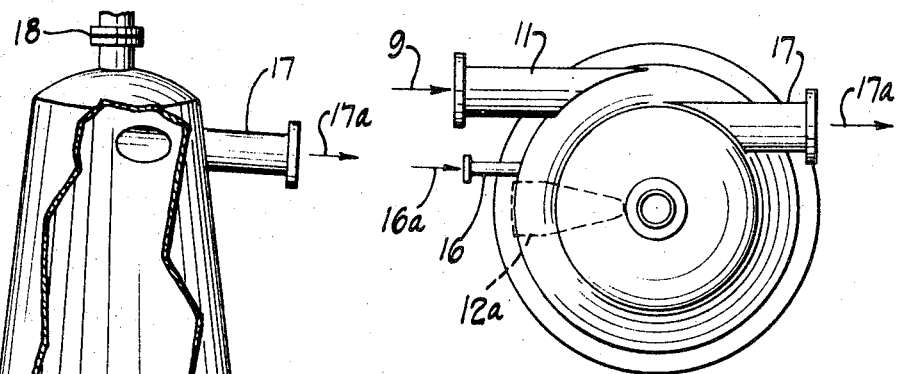
Fig. 3
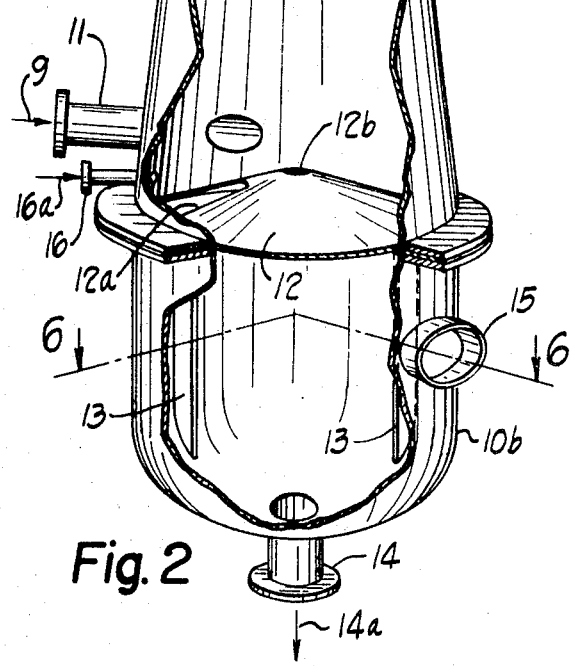
Fig. 2
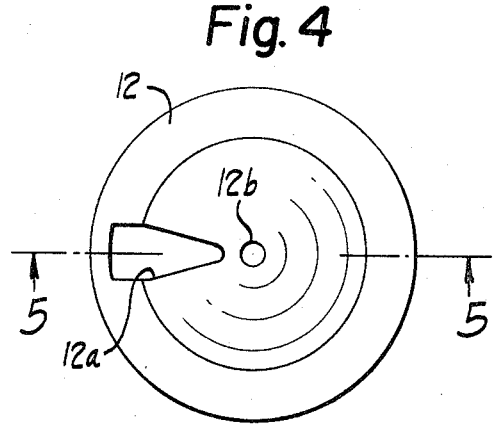
Fig. 4
Fig. 5
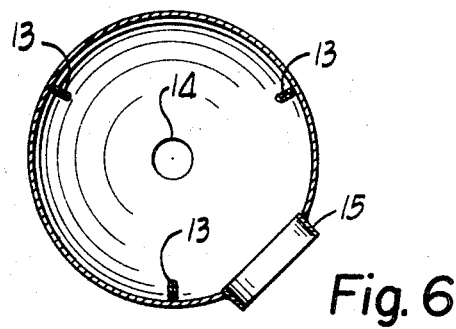
Fig. 6

CENTRIFUGAL SEPARATION APPARATUS

This is a continuation of application Ser. No. 76,645 filed Sept. 29, 1970 which is a continuation of application Ser. No. 781,055 filed Dec. 4, 1968 both being abandoned.

This invention relates to improvements in the separation of entrained liquids and solids from a gaseous stream. More particularly, this invention pertains to an apparatus for separating entrained cooking liquors and woodpulp from the wet gaseous digester effluent from conventional batch and continuous woodpulping processes.

In woodpulping processes, a digester vessel is charged with woodchips and an alkaline solution of cooking liquor. The woodchips are digested at elevated temperatures (e.g. 340° F. to 355° F.) and pressures (e.g. 100–125 psi) to produce fibrous woodpulp and gaseous by-products containing non-condensibles, water, turpentine and other chemical products. As these gaseous by-products are liberated by the digestion reaction, they are vented to a centrifugal separator to remove entrained cooking liquor and woodpulp. The entrained cooking liquor and woodpulp are separated and recovered, and the gaseous effluent stream containing water and turpentine passes to a condensation recovery process. Such a recovery process is disclosed in commonly assigned co-pending application entitled, Turpentine Recovery from Woodpulping Processes, Ser. No. 751,425, filed Aug. 9, 1968.

Conventionally, this centrifugal separator is a cyclone type as described in the article "Typical Turpentine Recovery Systems For Batch Digesters" by Dan C. Tate, appearing in the TAPPI Journal, Vol. 50, No. 4 (April, 1967). These cyclone separators are often inefficient in that they are designed for the removal of liquids from gases and do not provide for the efficient handling of solids in the form of pulp, fiber and chips. These cyclone separators often become plugged with solids and require attention.

The present invention provides a centrifugal separation apparatus specifically designed to de-entrain liquids and solids from such gaseous streams.

According to the present invention, efficient separation of entrained cooking liquid and entrained woodpulp from gaseous streams containing turpentine and water is accomplished in a tubular conical cyclone apparatus provided with an apertured diaphragm or baffle plate which reduces gas turbulence, minimizes undesirable accumulation of solids, and maximizes the separation and removal of liquids and solids. The cyclone or conical de-entrainment chamber of the present apparatus is in the form of an inverted cone when compared to cyclone chambers of conventional design.

The above and other features and advantages of the present invention will be more fully understood from the following description and drawings wherein:

FIG. 2 is a broken sectional illustration of an apparatus embodying the present invention;

FIG. 3 is a top view of the apparatus illustrated in FIG. 2;

FIG. 4 is a top view of the apertured diaphragm in the apparatus of FIG. 2;

FIG. 5 is a cross-sectional view taken along line 5—5 of FIG. 4;

FIG. 6 is a cross-sectional view taken along line 6—6 of FIG. 2.

Figure 1:
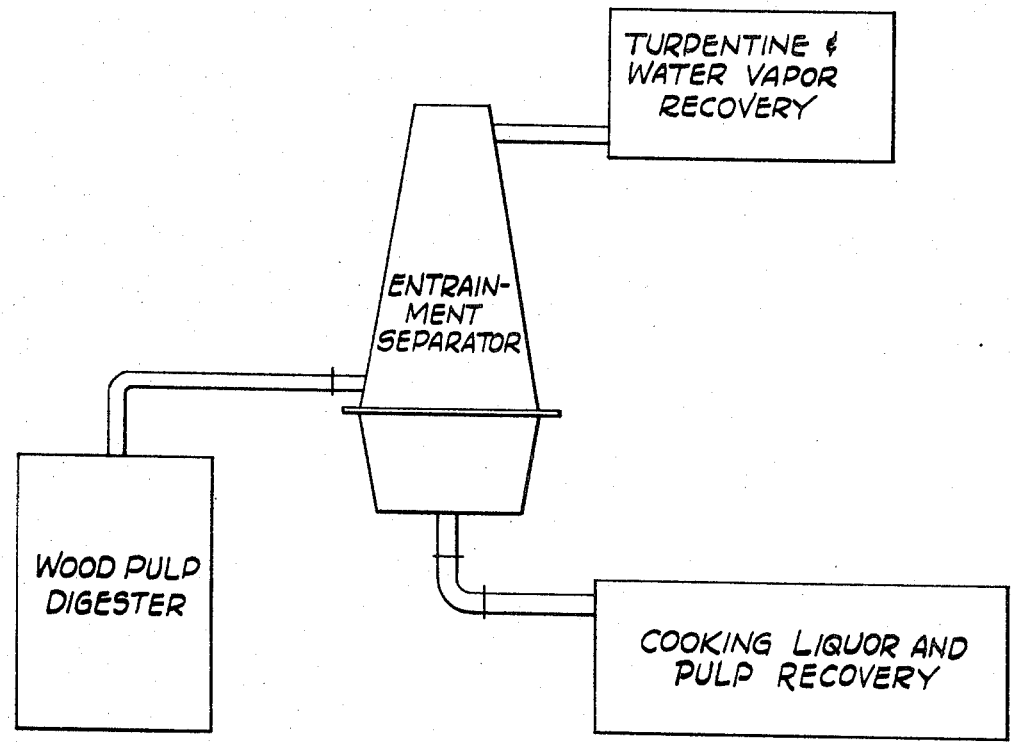
FIG. 1 is a process schematic illustrating the entrainment separating apparatus in a typical woodpulping process.

Referring now to FIG. 2, the digester effluent stream 9 containing non-condensible gases, turpentine and water vapors, entrained cooking liquids and woodpulp enters centrifugal entrainment separator, generally indicated by reference numeral 10, through tangential inlet 11. Inlet 11 is shown at a slight angle (e.g. 3°–5°) above the horizontal to impart an initial downward helical motion to stream 9. This downward motion directs stream 9 against apertured diaphragm or baffle plate 12. The diaphragm 12 is shown as being slightly conical in configuration to reinforce the downward helical motion of stream 9. Diaphragm 12 partitions separator 10 into two chambers, the conical de-entrainment chamber 10a above the diaphragm 12 and the settling chamber 10b below diaphragm 12. According to this design, the apertured diaphragm 12 provides for efficient separation through the drainage of liquids and solids from the area of gas turbulence.

The liquids and solids in stream 9 (which are heavier than the vapors and gases) contact the diaphragm 12, are forced outwardly to the conical wall of de-entrainment chamber 10a and are centrifugally driven to the diaphragm aperture in the form of axial slot 12a. The slot extends to near the periphery of the diaphragm to efficiently collect the de-entrained liquids and solids. The geometry of the aperture is not critical provided it is large enough to allow passage of the solids therethrough. Other aperture designs such as rectangular, circular, triangular, and elliptical could serve this same general purpose. A second aperture 12b is shown in FIGS. 2, 3 and 4. This provides for pressure equalization between chambers 10a and 10b. In the drawings the slotted aperture 12a is positioned at an angle substantially in excess of 180° with respect to the axis of the incoming gas stream 9. By this design the slot is "upstream" of tangential inlet 11 and provides drainage of the liquid and solids at a point of low gas velocity and minimum turbulence. The solids pass through slot 12a and into the settling chamber 10b. Similarly, the entrained liquid which is forced to the wall of the de-entrainment chamber 10a collects as a film which drains by gravity to the diaphragm 12 and through slot 12a to settling chamber 10b.

The de-entrainment chamber 10a is provided with a flushant inlet 16 positioned for directing a stream of flushing liquid 16a onto diaphragm 12. Water and/or cooking liquid from the woodpulp digester can be used as the flushing liquid. This stream of flushing liquid supplements the film of entrained liquid to provide the liquid transport medium for carrying the woodpulp through slot 12a continuously without undesirable accumulation of solids on diaphragm 12. This stream of flushing liquid is not required when there is sufficient entrained liquids collecting on the wall to provide a liquid transport medium for carrying the pulp through slot 12a. In most applications however, a steady flow of cooking liquor is used to provide sufficient transport medium regardless of the varying quantities of incoming liquid in the digester effluent stream.

FIG. 3 further illustrates the relationship of the tangential inlet 11, tangential outlet 17, flushing inlet 16, and slot 12a, in the embodiment of the present invention shown in FIG. 2. The flushant inlet 16 is shown parallel to, and "upstream" of, tangential inlet 11 and "downstream" of slot 12a. The design provides for partial mixing of streams 9 and 16a and sufficient flushing action to prevent accumulation of solids on the diaphragm. Outlet 17 need not be tangentially positioned because the gaseous components will eventually flow through an opening of any positioning. The design and positioning of such outlets is known in the art. In the interest of economy and efficiency the outlet 17 is tangentially positioned to intercept the helically flowing gaseous components 17a of stream 9.

FIGS. 4 and 5 illustrate the slot design in the conical diaphragm illustrated in FIG. 2. The second aperture 12b is the apex of the conical diaphragm and serves to equalize the pressure between the de-entrainment chamber 10a and the settling chamber 10b.

Settling chamber 10b is illustrated in FIG. 2 and FIG. 6 as having a series of axial vanes 13 which serve to reduce rotational action and turbulence in the slurry of liquids and solids which pass through slot 12a. This design maximizes gravity drainage of the slurry of liquids and solids 14a through slurry discharge outlet 14. Settling chamber 10b is also provided with an inspection and clean-out port 15. Chamber 10b can be equipped with a monitoring device of convention design to provide a signal in the event of fouling.

While the liquids and solids are being centrifugally removed from stream 9 as described above, the gaseous components of stream 9, under the influence of the tangential force imparted on entry, contact the tapered wall of de-entrainment chamber 10a which results in a conical convolute flow pattern to outlet 17. It is an important feature of the present invention that gaseous components of stream 9 do not have a tendency to flow through slot 12a to settling chamber 10b. The slight taper of the conical de-entrainment chamber increases the rotational flow velocity and efficiently removes any remaining entrained liquid droplets in the form of a wet film flowing down the de-entrainment chamber wall. Outlet 17 is located near the apex of conical de-entrainment chamber 10a and is tangentially positioned so as to intercept and carry away the stream of gaseous components 17a. Outlet 17 is shown positioned at a slight angle (e.g. 3°–5°) below the horizontal to prevent any condensing vapors from flowing back into the de-entrainment chamber. If desired, the de-entrainment chamber 10a can be insulated and/or heated to prevent condensation of turpentine and water vapor. In this instance, it is not necessary to position outlet 17 at a slight angle below the horizontal. De-entrainment chamber 10a may be equipped with a pressure relief device such as rupture disc 18 which is designed to rupture at a predetermined pressure.

Apparatus according to the present invention is particularly adapted to accomodate the wide range of variables encountered in woodpulping digester operations.

In typical digester operations the velocity of flow of stream 9 can vary from 40 feet/second and lower to 500 feet/second and higher at temperatures ranging from 200°–300° F. At digester pressures the specific volume of stream 9 will be in the neighborhood of 3–4 cubic feet/pound while at atmospheric pressure the specific volume can be about 25–30 cubic feet/pound.

Under these conditions a centrifugal entrainment separator 10 having a settling chamber 10b of 4–5 feet in height and 3–4 feet in diameter; a de-entrainment chamber 10a of about 10 feet in height with a taper angle of about 3°; a wedge-shaped diaphragm slot 12a having a maximum opening width of about 8 inches; and a flushant flow rate of about 2–10 gallons/minute provides efficient separation.

Apparatus according to the present invention can be fabricated from conventional materials (e.g., metals, ceramics, alloys, glass-lined metal and the like) which are compatible with the solids, liquids and gases being separated. Mild steel equipment is satisfactory for the turpentine system described above.

Having thus described the invention, what is claimed is:

1. In a wet-wall, falling film centrifugal separation apparatus for centrifugally separating entrained black liquor and woodpulp from a gaseous effluent stream from a woodpulp digester, said apparatus comprising a generally frusto-conical shaped tubular housing terminating at the larger end in a bottom wall and having an upper smaller end opposite said bottom wall, said tubular housing having a first outlet for de-entrained liquids and solids positioned near said bottom wall, a second outlet for gaseous components positioned at or adjacent said upper end, and a tangential inlet for said gaseous stream positioned between said first outlet and said second outlet, said tangential inlet extending transversely to the axis of said tubular envelope;

the improvement which comprises a diaphragm positioned radially within said housing between said first outlet and said tangential inlet, said diaphragm having a relatively smooth unobstructed upper surface and an aperture in the form of a substantially radial slot, said slot being in a zone of relatively low gas velocity removed, in the direction of flow of said gaseous stream, from the tangential inlet by a major portion of said upper surface, the periphery of said diaphragm extending to the conical wall of said housing thereby partitioning said housing into two zones and defining:

a. an unobstructed settling chamber in that zone between said diaphragm and said bottom wall; and b. a de-entrainment chamber in that zone between said diaphragm and said upper end with the tangential inlet positioned adjacent the diaphragm, said aperture in said diaphragm communicating between the chambers, said aperture extending from adjacent the periphery of said diaphragm to adjacent the center and being sufficiently large and unobstructed by protrusions to continously pass black liquor and de-entrained woodpulp therethrough, whereby centrifugal separation of black liquor and woodpulp is achieved in said de-entrainment chamber, and black liquor and woodpulp collecting thereon pass therefrom into said settling chamber through said aperture.

2. The apparatus of claim 1 further including a second aperture axially positioned in said diaphragm for equalization of pressure between said chambers, and means for preventing the flow of black liquor and woodpulp across and into said second aperture.

3. In a wet-wall, falling film centrifugal separation apparatus for centrifugally separating entrained black liquor and woodpulp from a gaseous effluent stream from a woodpulp digester, said apparatus comprising a frusto-conical tubular housing terminating at the larger end in a bottom wall, and having a top wall at the smaller end opposite said bottom wall, said tubular housing having a first outlet for de-entrained liquids and solids positioned near said bottom wall, a second outlet for gaseous components positioned near said top wall, and a tangential inlet for said gaseous stream positioned between said first outlet and said second outlet, said tangential inlet extending transversely to the axis of said tubular housing;

the improvement which comprises a frusto-conical diaphragm positioned radially within said tubular housing between said first outlet and said tangential inlet, said diaphragm being conical in configuration and having an aperture in the form of a substantially radial slot, wherein the axis of said slot is positioned at an angle substantially in excess of 180° with respect to the axis of the incoming gaseous stream, teh periphery of said diaphragm extending to the conical wall of said tubular housing thereby partitioning said housing into two zones and defining;
a. an unobstructed settling chamber in that zone between said diaphragm and said bottom wall; and
b. a de-entrainment chamber in that zone between said diaphragm and said top wall with the tangential inlet positioned adjacent the diaphragm, said aperture in said diaphragm communicating between the chambers, said aperture extending from adjacent the periphery of said diaphragm to adjacent the center and being sufficiently large and unobstructed by protrusions to continuously pass black liquor and de-entrained woodpulp therethrough, whereby centrifugal separation of black liquor and woodpulp is achieved in said de-entrainment chamber, and black liquor and woodpulp collecting thereon pass therefrom into said settling chamber through said aperture.

4. The apparatus of claim 3 wherein said tubular envelope further includes a second inlet positioned for directing a stream of flushing liquid into said de-entrainment chamber and onto said diaphragm.

5. The apparatus of claim 4 wherein said settling chamber further includes a plurality of spaced axial vanes.

6. The apparatus of claim 3 wherein said second outlet is tangentially positioned transversely to the axis of said tubular envelope.

7. The apparatus of claim 6 wherein said tangential inlet is positioned at a slight angle towards said apex, and the tangentially positioned second outlet is at a slight angle towards said base.

8. The apparatus of claim 3 wherein the axis of said slot is positioned at an angle substantially in excess of 180° with respect to the axis of the incoming gaseous stream.

9. The apparatus of claim 3 wherein said second inlet is positioned on said tubular envelope at a point adjacent said diaphragm.

* * * * *